United States Patent
Johnson

(10) Patent No.: US 8,991,383 B2
(45) Date of Patent: Mar. 31, 2015

(54) CONVECTION OVEN USING RACK SUPPORT DUCTS FOR AIR FLOW

(75) Inventor: Eric Scott Johnson, Louisville, KY (US)

(73) Assignee: General Electric Company, Schenectady, NY (US)

(*) Notice: Subject to any disclaimer, the term of this patent is extended or adjusted under 35 U.S.C. 154(b) by 519 days.

(21) Appl. No.: 13/461,890

(22) Filed: May 2, 2012

(65) Prior Publication Data

US 2013/0291854 A1   Nov. 7, 2013

(51) Int. Cl.
*A21B 1/26* (2006.01)
*F24C 15/32* (2006.01)
*F24C 15/16* (2006.01)
*A21B 1/24* (2006.01)

(52) U.S. Cl.
CPC ............. *F24C 15/166* (2013.01); *F24C 15/322* (2013.01); *A21B 1/245* (2013.01); *A21B 1/26* (2013.01)
USPC ...................... 126/21 A; 126/273 R; 219/400

(58) Field of Classification Search
CPC .... F24C 15/166; F24C 15/322; F24C 15/325; F24C 15/327; A21B 1/245; A21B 1/26
USPC ............... 126/21 A, 21 R, 273 R, 273.5, 274, 126/275 R, 275 E, 275 A; 219/400
See application file for complete search history.

(56) References Cited

U.S. PATENT DOCUMENTS

| | | | | | |
|---|---|---|---|---|---|
| 1,943,575 | A | * | 1/1934 | Abendroth | 119/318 |
| 3,605,717 | A | * | 9/1971 | Sauer | 126/21 A |
| 3,861,378 | A | * | 1/1975 | Rhoads et al. | 126/21 A |
| 3,991,737 | A | * | 11/1976 | Del Fabbro | 126/21 A |
| RE31,765 | E | * | 12/1984 | Guibert | 126/21 A |
| 4,730,100 | A | * | 3/1988 | Pingelton | 219/400 |
| 5,816,234 | A | * | 10/1998 | Vasan | 126/21 A |
| 6,021,709 | A | * | 2/2000 | Koopman et al. | 126/21 A |
| 6,054,686 | A | * | 4/2000 | Pauly et al. | 219/400 |
| 6,069,344 | A | | 5/2000 | Krasznai et al. | |
| 6,637,320 | B2 | * | 10/2003 | Grandi | 99/468 |
| 8,042,458 | B2 | * | 10/2011 | Ueda et al. | 126/21 A |
| 2010/0301034 | A1 | * | 12/2010 | Greenwood et al. | 219/400 |
| 2013/0092145 | A1 | * | 4/2013 | Murphy et al. | 126/21 R |

* cited by examiner

*Primary Examiner* — Kenneth Rinehart
*Assistant Examiner* — David J Laux
(74) *Attorney, Agent, or Firm* — Dority & Manning, P.A.

(57) ABSTRACT

An oven appliance is provided that uses the space behind oven rack supports formed in the side walls of the cooking chamber to provide for convection air flow. Slots or openings are provided along the supports for the flow of air into the cooking chamber. Additional features may be provided to further assist in directing the convection air flow. Such distribution of the convection air can provide for a more uniform flow of the heated, convection air while also conserving the space available in the oven for the cooking chamber.

18 Claims, 5 Drawing Sheets

CONVECTION OVEN USING RACK SUPPORT DUCTS FOR AIR FLOW

FIELD OF THE INVENTION

The subject matter of the present disclosure relates generally to convection oven appliances.

BACKGROUND OF THE INVENTION

Oven appliances generally include a cabinet with a cooking chamber positioned therein. The cooking chamber is configured for receipt of food articles for cooking. The oven appliance also includes a heating element for generating heat energy for cooking. The heating element can be, e.g., an electric resistance element or a gas burner.

Certain oven appliances also include features for forcing movement of heated air within the cooking chamber. Such oven appliances are generally referred to as convection ovens or ovens with a convection mode of cooking. For example, the oven may have a selection between convection and non-convection modes.

When cooking in a convection mode, for typical conventional ovens, heated air within the cooking chamber is circulated with a fan. The fan initiates a flow of heated air through a plurality of openings in a wall of the oven's cabinet. For example, in certain other convection ovens, the fan initiates a flow of heated air by pulling air from the cooking chamber through a plurality of openings in a back wall of the cooking chamber. The heated air then exits other openings in the side wall. The heated air exiting these openings moves through the cooking chamber to help distribute heat energy to food placed on racks in the oven.

However, such conventional systems can generate regions of high and low speed air flow in the cooking chamber such that the heated air is not uniformly distributed in the cooking chamber. As a result, foods placed in the oven may cook unevenly. For example, foods placed on different racks at different heights within the oven may cook at different rates. In addition, even foods placed at the same level may not receive uniform heating on e.g., the top and bottom due to non-uniform heat distribution cause by the varying regions of air speed in the oven.

Openings for the delivery of heated air from the fan can also be placed along the sides of the oven. However, ducts or channels must be provided to deliver the air from the fan to such openings. Typically, the volume for providing these ducts subtracts from the overall volume available in the cooking chamber. This is undesirable because certain consumers may prefer ovens having a larger cooking chamber. Additionally, the openings along the sides must be positioned in a manner that does not interfere with any features along the side walls that are used to help support one or more oven racks.

Accordingly, an oven appliance with features for improved convection cooking would be useful. In particular, an oven appliance with features for creating a more uniform flow of heated air within the cooking chamber during convection cooking would be beneficial. Such an oven that can also help maximize the space available for the cooking chamber while providing for a more uniform flow of heated air during cooking operations would also be very useful.

BRIEF DESCRIPTION OF THE INVENTION

The present invention provides an oven appliance that uses the space behind oven rack supports formed in the side walls of the cooking chamber to provide for convection air flow. Slots or openings are provided along the supports for the flow of air into the cooking chamber. Additional features may be provided to further assist in directing the convection air flow. Such distribution of the convection air can provide for a more uniform flow of the heated, convection air while also conserving the space available in the oven for the cooking chamber. Aspects and advantages of the invention will be set forth in part in the following description, or may be obvious from the description, or may be learned through practice of the invention.

For example, in one exemplary embodiment, the present invention provides an oven appliance that includes a cabinet and a cooking chamber positioned within the cabinet and configured for receipt of food items for cooking. The cooking chamber is defined in part by a top wall, a bottom wall, a rear wall, and opposing side walls. A plurality of oven rack supports project from one or more walls of the cooking chamber. The oven rack supports define a plurality of openings positioned along one or more of the oven rack supports that are configured for the flow of convection oven air into the cooking chamber. A fan is provided for causing air to flow into the cooking chamber through the openings of the oven rack supports.

In another exemplary embodiment, the present invention provides an oven appliance that includes a cooking chamber configured for receipt of food items for cooking. The cooking chamber is defined in part by a top wall, a bottom wall, a rear wall, and opposing side walls. At least one oven rack support is positioned along and projects from one of the walls of the cooking chamber. At least one opening is defined by the oven rack support and is configured for the flow of convection oven air into the cooking chamber. At least one air flow channel is positioned within the oven rack support to direct a flow of oven air to the at least one opening. A fan is provided for causing air to flow from the cooking chamber, into the at least one air flow channel of the oven rack support, and through the at least one opening of the oven rack support.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features. In the figures, arrows H indicate the horizontal directions, arrows V indicate the vertical directions, and arrows D indicate direction along the depth of the appliance.

DETAILED DESCRIPTION OF THE INVENTION

Figure 1:
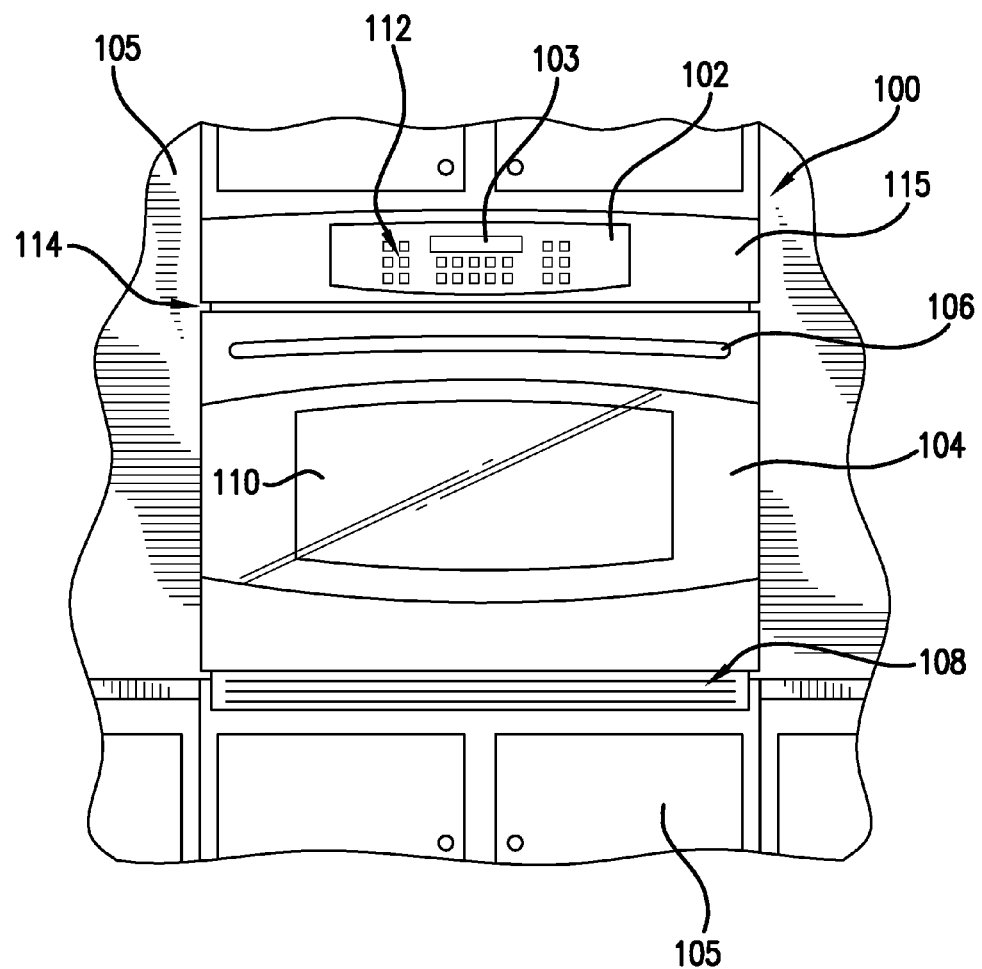
FIG. 1 provides a front view of an exemplary embodiment of an oven appliance of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
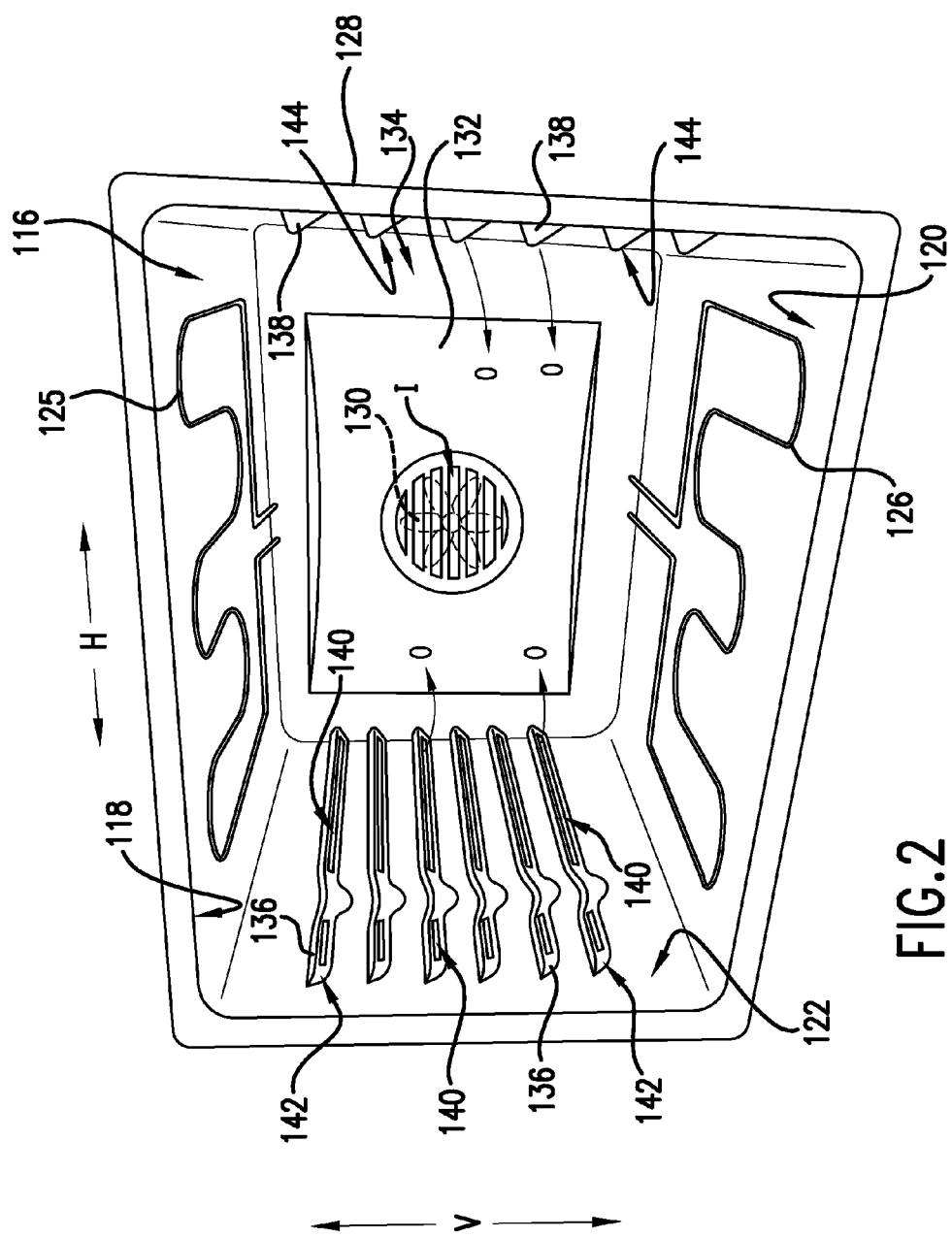
FIG. 2 provides a perspective view of an exemplary embodiment of a cooking chamber or cooking cavity of the present invention.

FIG. 1 provides a front view of an exemplary embodiment of an oven 100 as may be used with the present invention. FIG. 2 provides a perspective view of an exemplary embodiment of a cooking cavity or cooking chamber 116 of the present invention as may be contained within the oven 100 of FIG. 1. As shown, oven 100 is installed into the cabinetry 105 of a kitchen. The present invention may be used with other configurations as well including e.g., range ovens, double ovens, and others as well.

Oven 100 includes a door 104 with handle 106 that provides for opening and closing access to a cooking chamber 116. A user of the appliance 100 can place a variety of different items to be cooked in chamber 116. Cooking chamber 116 is equipped with a convection mode of oven operation as will be further described herein.

Cooking chamber 116 is defined in part by top wall 118, bottom wall 120, and opposing side walls 122 and 124. A top heating element 125 is positioned along top wall 118 while a bottom heating element 126 is positioned along bottom wall 120. Heating elements 125 and 126 can provided for cooking operations in convection oven mode as well as for oven cleaning. Such heating element(s) can be e.g., gas, electric, microwave, or a combination thereof.

A window 110 on door 104 allows the user to view e.g., food items during the cooking process. For purposes of cooling, intake 114 allows for an inflow of ambient air into a ventilation system while vent 108 allows for the outflow of such air after it has been heated by oven 100. The air is passed through a system of cooling ducts generally positioned between cooking chamber 116 and the cabinet 128 of oven 100.

Oven 100 includes a user interface 102 having a display 103 positioned on top panel 115 with a variety of controls 112. Interface 102 allows the user to select various options for the operation of oven 100 including e.g., temperature, time, and/or various cooking and cleaning cycles. Operation of oven appliance 100 can be regulated by a controller (not shown) that is operatively coupled i.e., in communication with, user interface panel 102, heating element(s), and other components of oven 100 as will be further described.

For example, in response to user manipulation of the user interface panel 102, the controller can operate heating elements 125 and/or 126 in modes that include convection oven operation where heated oven air is circulated in cooking chamber 116 using a fan 130 positioned behind a panel 132 along rear wall 134. The controller can receive measurements from a temperature sensor (not shown) placed in cooking chamber 116 and e.g., provide a temperature indication to the user with display 103. By way of example, the controller may include a memory and one or more processing devices such as microprocessors, CPUs or the like, such as general or special purpose microprocessors operable to execute programming instructions or micro-control code associated with operation of appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller may be positioned in a variety of locations throughout appliance 100. In the illustrated embodiment, the controller may be located under or next to the user interface 102 or otherwise within top panel 115. In such an embodiment, input/output ("I/O") signals are routed between the controller and various operational components of appliance 100 such as heating elements 125 and 126, controls 112, display 103, sensor(s), alarms, and/or other components as may be provided. In one embodiment, the user interface panel 102 may represent a general purpose I/O ("GPIO") device or functional block.

Although shown with touch type controls 112, it should be understood that controls 112 and the configuration of appliance 100 shown in FIG. 1 is provided by way of example only. More specifically, user interface 102 may include various input components, such as one or more of a variety of electrical, mechanical or electro-mechanical input devices including rotary dials, push buttons, and touch pads. The user interface 102 may include other display components, such as a digital or analog display device designed to provide operational feedback to a user. The user interface 102 may be in communication with the controller via one or more signal lines or shared communication busses.

Continuing with FIG. 2, cooking chamber 116 is configured with a plurality of oven rack supports configured as opposing pairs 136, 138 positioned on opposing side walls 122 and 124. Each pair of oven rack supports 136, 138 are placed at the same level along the vertical direction V and extend to back wall 134 along depth D (FIG. 3) so as provide multiple levels for the height adjustment of one or more oven racks (not shown) that can be placed upon supports 136, 138. Accordingly, a user can adjust such racks to accommodate e.g., multiple racks, large food items and/or utensils, and/or the positioning relative to the top and bottom heating elements 125 and 126.

Each oven rack support 136 and 138 includes one or more openings—shown in FIG. 2 as slots 140. These slots 140 provide for a flow of air, created by fan 130, into oven cavity 116 during operation of oven 100 in a convection mode. The positioning of multiple slots 140 along each of the opposing walls 122 and 124 allows for a more uniform distribution of the flow of air within chamber 116. Additionally, slots 140 can be used to provide such air flow directly at food items and/or utensils placed on an oven rack carried by a pair of supports 136 and 138. Slots 140 are provided by way of example only. Other configuration such as e.g., circular openings and/or louvers may be used as well.

Figure 3:
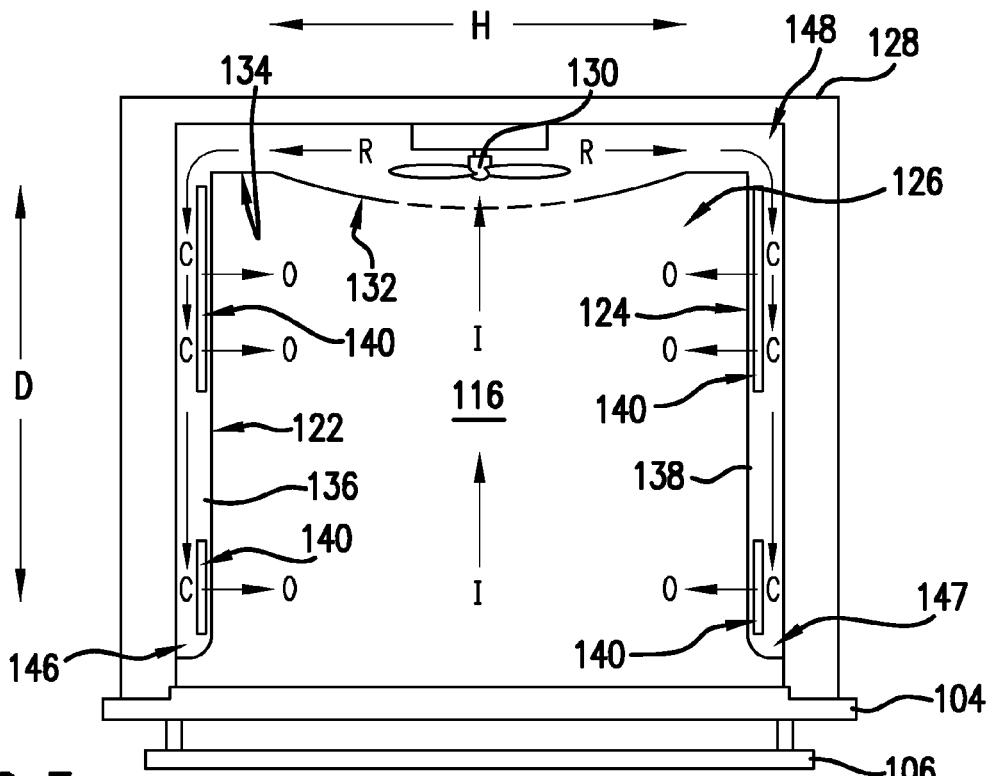
FIG. 3 provides a top down, schematic view of an exemplary embodiment of a cooking chamber of the present invention.

FIG. 3 provides a schematic view of the air flow within chamber 116 for the exemplary embodiment of FIG. 2 as viewed from the top down. Each oven rack support 136 and 138 is constructed as projection 142 and 144, respectively, from one of the opposing walls 122 or 124. In turn, these projections 142 and 144 are hollow or open inside to create channels 146 and 147 for the flow of air to slots 140. Air is supplied to projections 142 and 144 from a rear duct 148 positioned behind rear wall 134.

Accordingly, during operation of oven 100 in a convection mode, fan 130 draws air in from cooking chamber 116 as shown by arrows I and causes the same to flow through rear duct 148 as shown by arrows R. This air then enters channels 146 in supports 136 and 138 from a location near the rear wall 134 of cooking chamber 116. The air then flows through channels 146 as shown by arrows C and exits through multiple slots 140 as shown by arrows O so as to provide for a heated air flow back into cooking chamber 116.

Figure 4:
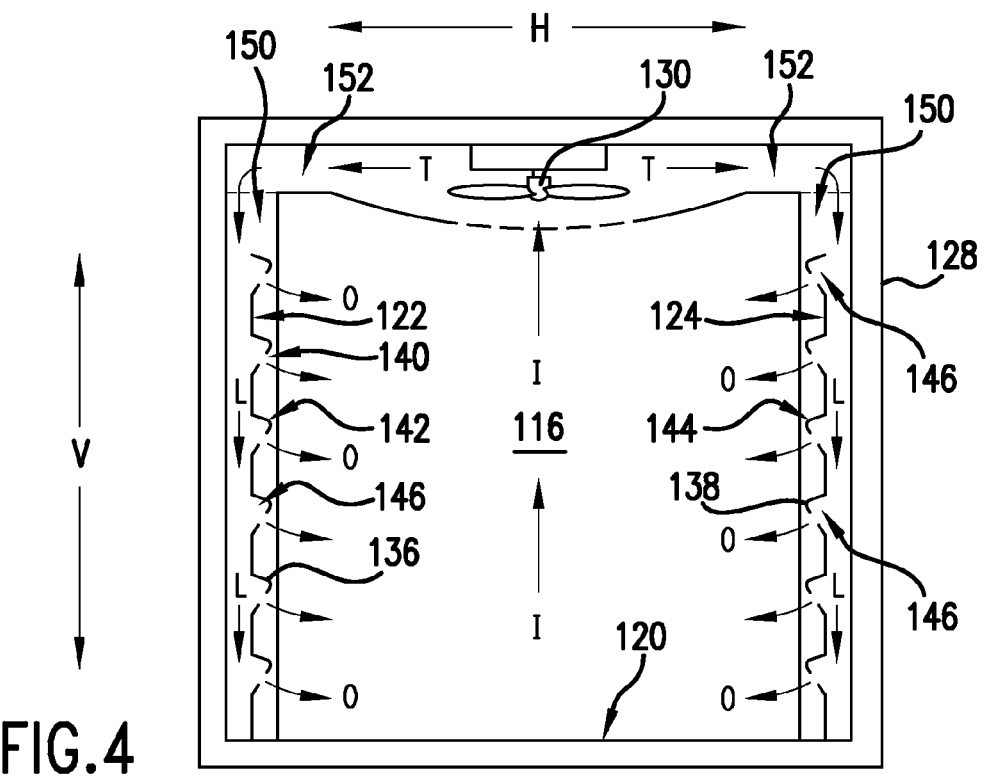
FIG. 4 provides a front, schematic view of an exemplary embodiment of a cooking chamber of the present invention.
Figure 5:
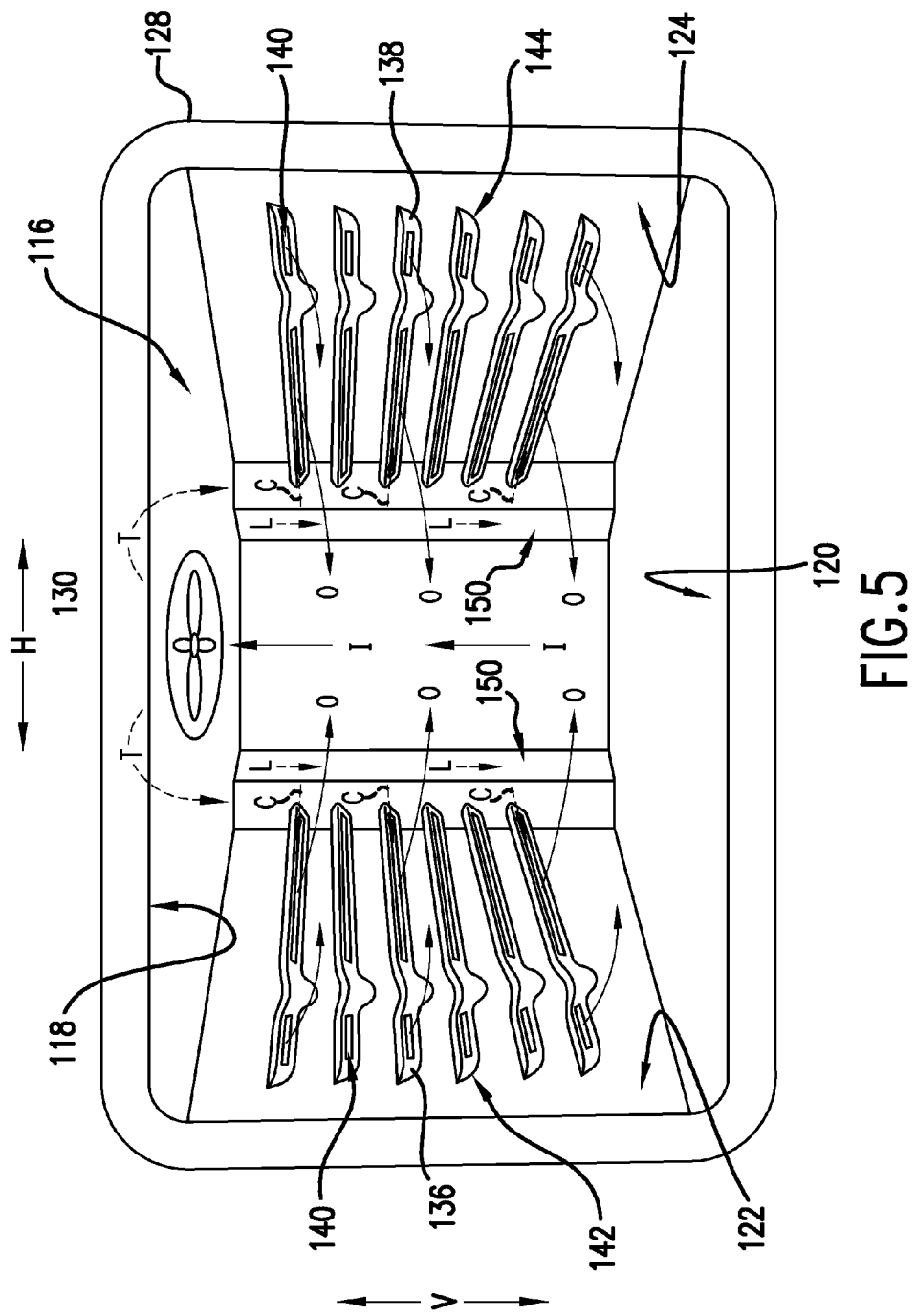
FIG. 5 illustrates a perspective view of the inside of an exemplary cooking chamber as may be provided within the exemplary embodiment of FIG. 4.

FIGS. 4 and 5 illustrate another exemplary embodiment of the present invention for oven 100 and cooking chamber 116. More particularly, FIG. 4 provides a schematic view from the front of cooking chamber 116 while FIG. 5 provides a perspective view from the front of cooking chamber 116. Each oven rack support 136 and 138 is constructed as projections 142 and 144, respectively, from one of the opposing walls 122 or 124. In turn, these projections 142 and 144 are hollow or open inside to create channels 146 for the flow of air to slots 140. Air is supplied to projections 142 and 144 from a pair of vertical ducts 150 positioned along the rear wall 134 of the cooking chamber 116. Vertical ducts 150 are in communication with a top duct 152 located behind top wall 118 of cooking chamber 116.

During operation of oven 100 in a convection mode, fan 130 draws air in from cooking chamber 116 as shown by arrows I and causes the same to flow through top duct 152 as shown by arrows T. This air then enters vertical ducts 150 and 152 and flows downwardly as shown by arrows L to channels 146 in supports 136 and 138 as shown by arrows C. The air enters channels 146 from locations near the rear wall 134 of cooking chamber 116. The air then flows through channels 146 and exits through multiple slots 140 as shown by arrows O so as to provide for a heated air flow back into cooking chamber 116.

The exemplary embodiments previously described are each shown with a plurality of oven rack supports configured in pairs and positioned on the opposing side walls with openings in each support of each pair of supports. However, using the teachings disclosed herein, one of skill in the art will understand that other configurations are available as well. For example, one or more openings could be positioned in one or more supports along only one side of the oven, one or more openings could alternate between different sides of the oven so as to provide openings at staggered levels, and other patterns or configurations could be used as well.

Also, one or more of the oven rack supports could be configured to projecting from multiple walls. For example, an oven rack support could have joined portions that extend from both a side wall and the rear wall (forming an L-shape in a top view) or could have joined portions extending from both opposing sides walls and the rear wall (forming a C-shape in a top view). Other configurations could be used as well.

Additionally, oven supports with one or more openings in the supports could also be located along the rear wall of the oven chamber either alone or in conjunction with opening in supports along the side walls. Again, other configurations that use one or more oven openings in one or more oven supports may be applied as well.

Figure 6:
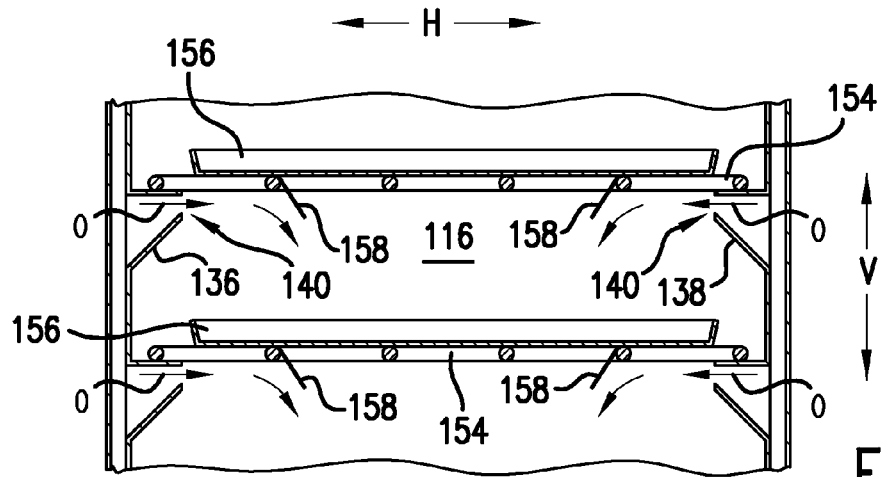
FIG. 6 is a schematic, cross-sectional view of a portion of exemplary cooking chamber of the present invention.

Additional features may be provided with any of the previously described embodiments to provided further control for the flow of air in oven cavity 116. For example, FIG. 6 provides a partial schematic view of oven cavity 116 showing oven racks 154 positioned upon and extending horizontally between corresponding pairs of oven rack supports 136, 138. Oven racks 154 are shown supporting kitchen utensils—in this example, trays 156.

Each oven rack 154 further includes a pair of air flow guides 158 connected to the oven rack 154 and projecting downwardly towards the bottom wall 120 of cooking chamber 116. In addition, each air flow guide is positioned adjacent to a corresponding slot 140 in oven rack supports 136 and 138. As such, the flow of air from slots 140 (arrows O) is directly downwardly and, therefore, towards food on a tray 156 located below.

Figure 7:
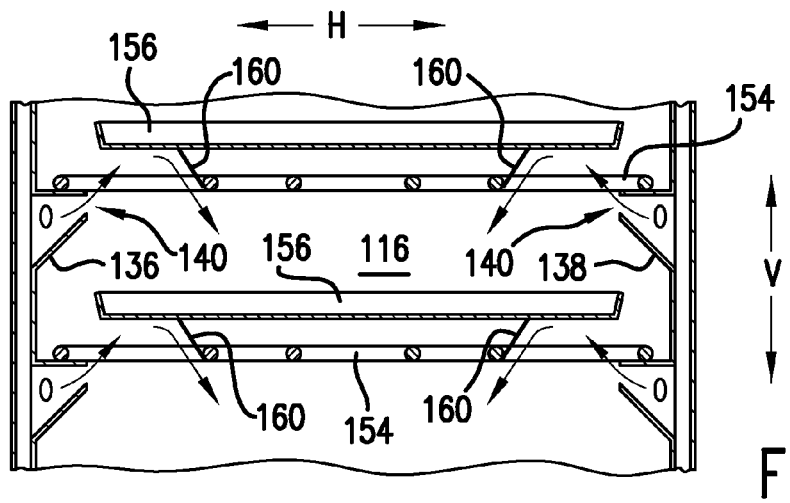
FIG. 7 is a schematic, cross-sectional view of a portion of another exemplary cooking chamber of the present invention.

FIG. 7 provides a partial schematic view of oven cavity 116 showing another exemplary embodiment of oven racks 154 positioned upon and extending horizontally between corresponding pairs of oven rack supports 136, 138. Oven racks 154 are also shown supporting trays 156. For this embodiment, each oven rack 154 further includes a pair of air flow guides 160 connected to the oven rack 154 and projecting upwardly towards the top wall 118 of cooking chamber 116. In addition, each air flow guide is positioned adjacent to a corresponding slot 140 in oven rack supports 136 and 138. As such, the flow of air from slots 140 (arrows O) is directly upwardly and, therefore, towards the bottom of a rack 154 with a tray 156.

Figure 8:
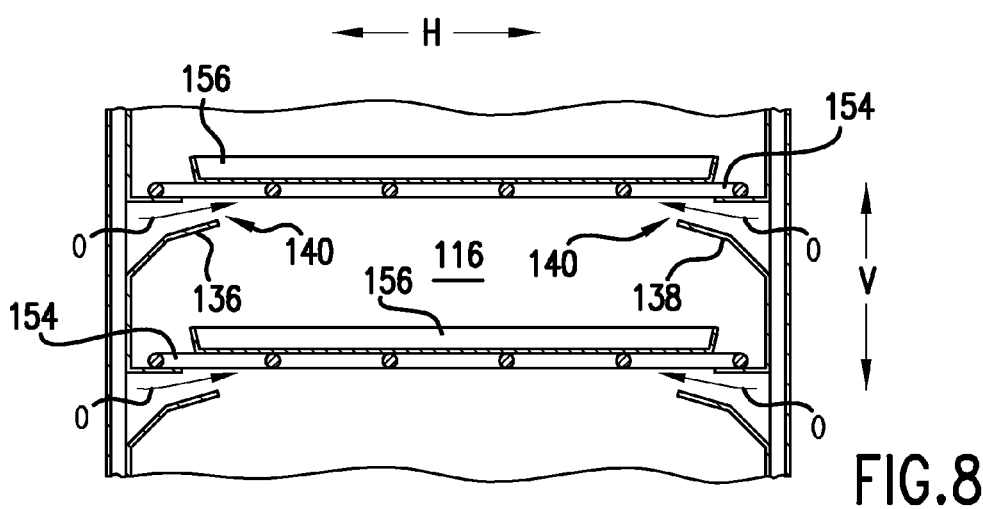
FIG. 8 is a schematic, cross-sectional view of a portion of still another exemplary cooking chamber of the present invention.

FIG. 8 provides a partial schematic view of oven cavity 116 showing another exemplary embodiment of the present invention. For this embodiment, the oven rack supports 136 and 138 are constructed so that openings 140 direct the flow air upwardly towards the bottom of a corresponding oven rack 154.

Although the flow guides are shown in pairs for these embodiments, it will be understood using the teachings disclosed herein that pairs are not required. Instead, for example, guides could be positioned along one side of an oven rack or even staggered between sides. Other configurations may be used as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance, comprising:
a cooking chamber configured for receipt of food items for cooking, said cooking chamber defined in part by a top wall, a bottom wall, a rear wall, and opposing side walls;
at least one oven rack support positioned along and projection from one of the walls of said cooking chamber;
at least one opening defined by said oven rack support and configured for the flow of convection oven air into said cooking chamber, and,
at least one air flow channel within said at least one oven rack support to direct a flow of oven air to said at least one opening, a fan for causing air to flow from said cooking chamber, into the at least one air flow channel of said oven rack support, and through the at least one opening on said at least one oven rack support.

2. An oven appliance as in claim 1, wherein said at least one oven rack support comprises a pair of oven rack supports positioned in an opposing manner along the side walls.

3. An oven appliance as in claim 2, wherein said at least opening comprises a pair of openings defined by said pair of oven rack supports.

4. An oven appliance, comprising:
a cabinet;
a cooking chamber positioned within said cabinet and configured for receipt of food items for cooking, said cooking chamber defined in part by a top wall, a bottom wall, a rear wall, and opposing side walls;
a plurality of oven rack supports projecting from one or more of the walls of said cooking chamber, said oven rack supports defining a plurality of openings positioned along one or more of said oven rack supports and configured for the flow of convection oven air into said cooking chamber, wherein said oven rack support projections extend horizontally along the opposing side walls of said cooking chamber, the projections forming channels for the flow of air along the opposing side walls and into said cooking chamber through the openings in said oven rack supports; and
a fan for causing air to flow into said cooking chamber through the openings on said oven rack supports.

5. An oven appliance as in claim 4, wherein said plurality of oven rack supports are configured in pairs and are positioned on the opposing side walls of said oven chamber.

6. An oven appliance as in claim 5, wherein said fan is positioned along the rear wall of the cooking chamber and is configured to draw air from said cooking chamber through the rear wall for supply to the openings on said oven rack supports.

7. An oven appliance as in claim 6, further comprising a rear duct positioned between the rear wall of said cooking chamber and said cabinet, said duct configured for routing air from said fan to the channels of said oven rack supports.

8. An oven appliance as in claim 7, wherein said openings are configured as slots extending along said oven rack supports.

9. An oven appliance as in claim 6, further comprising:
an oven rack positioned upon and extending horizontally between said oven rack supports, said oven rack comprising at least one air flow guide projecting towards the bottom wall of said cooking chamber, said air flow guide positioned adjacent to one or more of the openings of the oven rack supports and configured to direct the flow of air from such one or more openings downwardly.

10. An oven appliance as in claim 6, further comprising:
an oven rack positioned upon one or more of said oven rack supports, said oven rack comprising at least one air flow guide projecting towards the top wall of said cooking chamber, said air flow guide positioned adjacent to one or more openings of the oven rack supports and configured to direct the flow of air from the one or more openings upwardly.

11. An oven appliance as in claim 6, wherein said openings are configured to direct a flow of air towards the top wall of the cooking chamber.

12. An oven appliance as in claim 6, wherein said openings are configured to direct a flow of air towards the bottom wall of the cooking chamber.

13. An oven appliance as in claim 4, wherein said fan is positioned along the top wall of the cooking chamber and is configured to draw air from said cooking chamber through the top wall for supply to the openings on said oven rack supports.

14. An oven appliance as in claim 13, further comprising a top duct positioned between the top wall of said cooking chamber and said cabinet, said duct configured for routing air from said fan to the channels of said oven rack supports.

15. An oven appliance as in claim 14, further comprising a pair of vertical ducts positioned along the rear wall of said cooking chamber and said cabinet, said vertical ducts in communication with said top duct and configured for routing air from said fan to the channels of said oven rack supports.

16. An oven appliance as in claim 13, wherein said openings are configured as slots extending along said oven rack supports.

17. An oven appliance as in claim 13, further comprising:
an oven rack positioned upon one or more of said oven rack supports, said oven rack comprising at least one air flow guide projecting towards the bottom wall of said cooking chamber, said air flow guide positioned adjacent to one or more openings on the oven rack supports and configured to direct the flow of air from the one or more openings downwardly.

18. An oven appliance as in claim 13, further comprising:
an oven rack positioned upon one or more of said oven rack supports, said oven rack comprising at least one air flow guide projecting towards the top wall of said cooking chamber, said air flow guide positioned adjacent to one or more openings on the oven rack supports and configured to direct the flow of air from the one or more openings upwardly.

* * * * *